(12) United States Patent
Cousin

(10) Patent No.: US 6,589,040 B1
(45) Date of Patent: Jul. 8, 2003

(54) CUTTING DEVICE FOR PURGING AN EXTRUDER

(75) Inventor: Frederic Cousin, Sarralbe (FR)

(73) Assignee: Solvay Polyolefins Europe-Belgium (Société Anonyme), Brussels (BE)

( * ) Notice: Subject to any disclaimer, the term of this patent is extended or adjusted under 35 U.S.C. 154(b) by 0 days.

(21) Appl. No.: 09/774,185
(22) PCT Filed: Jul. 21, 1999
(86) PCT No.: PCT/EP99/05358
§ 371 (c)(1),
(2), (4) Date: Apr. 25, 2001
(87) PCT Pub. No.: WO00/07797
PCT Pub. Date: Feb. 17, 2000

(30) Foreign Application Priority Data

Aug. 3, 1998 (BE) .............................. 9800582

(51) Int. Cl.$^7$ ............................................ B29B 17/00
(52) U.S. Cl. ................................ 425/215; 425/DIG. 116
(58) Field of Search ................ 425/215, 216, 425/217, DIG. 116, 308, 199

(56) References Cited

U.S. PATENT DOCUMENTS 2,234,644 A * 3/1941 Herglotz .................... 264/120
3,880,069 A * 4/1975 Moline ........................ 99/483
4,063,718 A * 12/1977 Koch ........................... 366/75
4,134,714 A * 1/1979 Driskill ...................... 425/113

FOREIGN PATENT DOCUMENTS

DE          0086400 A1  *  2/1983

* cited by examiner

Primary Examiner—James P. Mackey
Assistant Examiner—Joseph S Del Sole
(74) Attorney, Agent, or Firm—Oblon, Spivak, McClelland, Maier & Neustadt, P.C.

(57) ABSTRACT

A device for purging a high-output polymer extruder includes a purge valve for discharging a molten polymer from the extruder. A cutting device is arranged at the output of this purge valve so as to be able to cut a continuous stream of polymer at the output of the purge valve into blocks. A conveying device, preferably hydraulic, is arranged at the output of the cutting device, so as to transport the blocks in a flow of liquid and convey them away from the discharge zone of the purge valve. The hydraulic conveying device preferably includes a chute equipped with a liquid-injection device, and a channel equipped with a device for creating a strong flow of liquid in the channel.

11 Claims, 4 Drawing Sheets

CUTTING DEVICE FOR PURGING AN EXTRUDER

BACKGROUND OF THE INVENTION

1. Field of the Invention

The present invention relates to a device for purging a high-output polymer extruder.

Starting up a polymer extruder entails having previously purged the extruder. The purpose of this purging operation is not only to avoid contamination of the extruded product but also to optimize the conditioning of the polymer before production begins.

2. Discussion of the Background

It is known practice for such start-up purging to be performed using a purge valve with which the extruder is equipped upstream of the die. At the time of purging, the valve does not deliver into the die but diverts the molten polymer on to a slide which guides the sausage of still rather inconsistent and very sticky polymer on to the ground, which has been wetted in preparation.

On a high-output extruder, a purging operation such as this entails the participation of numerous operators. The first operators use shovels to cut the sausage of polymer into blocks of about 15 kg and quickly push these blocks away from the slide discharge zone. Other operators use their shovels to transfer the blocks to a cooling zone, where they can cool and solidify in the air. The cooled blocks are then loaded manually into a skip.

To guarantee optimum extruder start-up and make it possible for production to be regulated effectively, it is important to have a purge rate close to the nominal throughput rate. Now, on modern extruders used for granulating polymers, the polymer throughput on purging may exceed 15 tonnes/hour. It then follows that the operators performing the purging have to work very quickly to remove several tonnes of hot, sticky polymer which are poured out on to the ground by the purge valve in a space of 10 to 15 minutes. This work is not only very demanding in terms of labour and a physically arduous task, but is also dangerous. This is because the operators are constantly exposed to a risk of burns on contact with the high-temperature polymer.

SUMMARY OF THE INVENTION

The object of the present invention is to make the operation of purging a high-output extruder less arduous and less dangerous.

According to the invention, this objective is achieved by a device for purging a polymer extruder.

According to the invention, the extruder comprises, in the way known per se, a purge valve allowing the stream of molten polymer to be discharged. According to the invention, a cutting device is arranged at the exit of the purge valve to cut the continuous stream of molten polymer leaving the purge valve into blocks. A conveying device is arranged at the exit of the cutting device for transporting these blocks immediately a certain distance away from the extruder. As a preference, the device is a hydraulic device which transports the blocks in a flow of liquid, generally an aqueous liquid, a certain distance away from the extruder. It will be appreciated that such a flow of liquid is a particularly reliable and effective means of quickly removing the still rather inconsistent and very sticky blocks of polymer. Specifically, the blocks of polymer are straight away cooled vigorously by direct contact with the conveying liquid, which causes almost instant solidification of their outer surface. The flow of conveying liquid effectively avoids the blocks sticking together again or sticking to the conveying device. It then follows that the purge device operates very reliably and requires practically no human intervention in removing the molten polymer in the form of blocks. This device therefore plays a part in appreciably improving the working conditions and safety when purging an extruder. By using the proposed device, significantly fewer operators are needed for start-up purging, it being possible at the same time, to operate with far higher purging throughputs. It should also be noted that the proposed device thus allows better conditioning of the blocks of polymer so that they can be recycled. In particular, it makes it possible to produce polymer blocks of a smaller size and more uniform weight than does manual purging.

The hydraulic conveying device advantageously comprises a block-discharge chute located beneath the cutting device. This chute is therefore equipped with a liquid-injection device so as to create in this chute a flow of liquid for transporting the blocks. Thus, the blocks can be quickly and reliably removed from the purge valve discharge zone.

The hydraulic conveying device may thus comprise a channel for receiving the said blocks cut by the cutting device. This channel is therefore equipped with a device for circulating a liquid so that the blocks are transported in the channel by a flow of liquid and cannot be in contact or block the channel. This channel constitutes a simple, effective and reliable means of conveying the blocks of polymer, which are not yet entirely solidified, to a location distant from the actual extrusion zone proper.

The hydraulic conveying device preferably opens into a device for collecting the blocks. This device is advantageously equipped in such a way as to hold the blocks while allowing the liquid which conveyed the said blocks to pass through.

Such a device for collecting the blocks may, for example, comprise a collecting skip arranged in a pit so that the blocks transported by the flow of liquid drop into the skip. The bottom and/or side walls of the skip therefore advantageously comprise openings for discharging the liquid, through which openings the liquid can flow when the skip is raised. As a preference, the bottom and the side walls of the skip comprise discharge openings.

The cutting device preferably comprises a two-edged knife which is guided in sliding in a support structure fixed on the exit section of the start-up valve. This knife is advantageously actuated by a linear motor, such as a double-acting pneumatic cylinder, for example, controlled by a timing relay. By adjusting the time that elapses between two successive actuations of the cylinder, the size of the blocks of polymer can adjusted to fit the purge rate.

BRIEF DESCRIPTION OF THE DRAWINGS

Other specifics and features of the invention will become apparent from the detailed description of one advantageous embodiment of the invention which refers to the appended drawings. These show.

DESCRIPTION OF THE PREFERRED EMBODIMENTS

Figure 1:
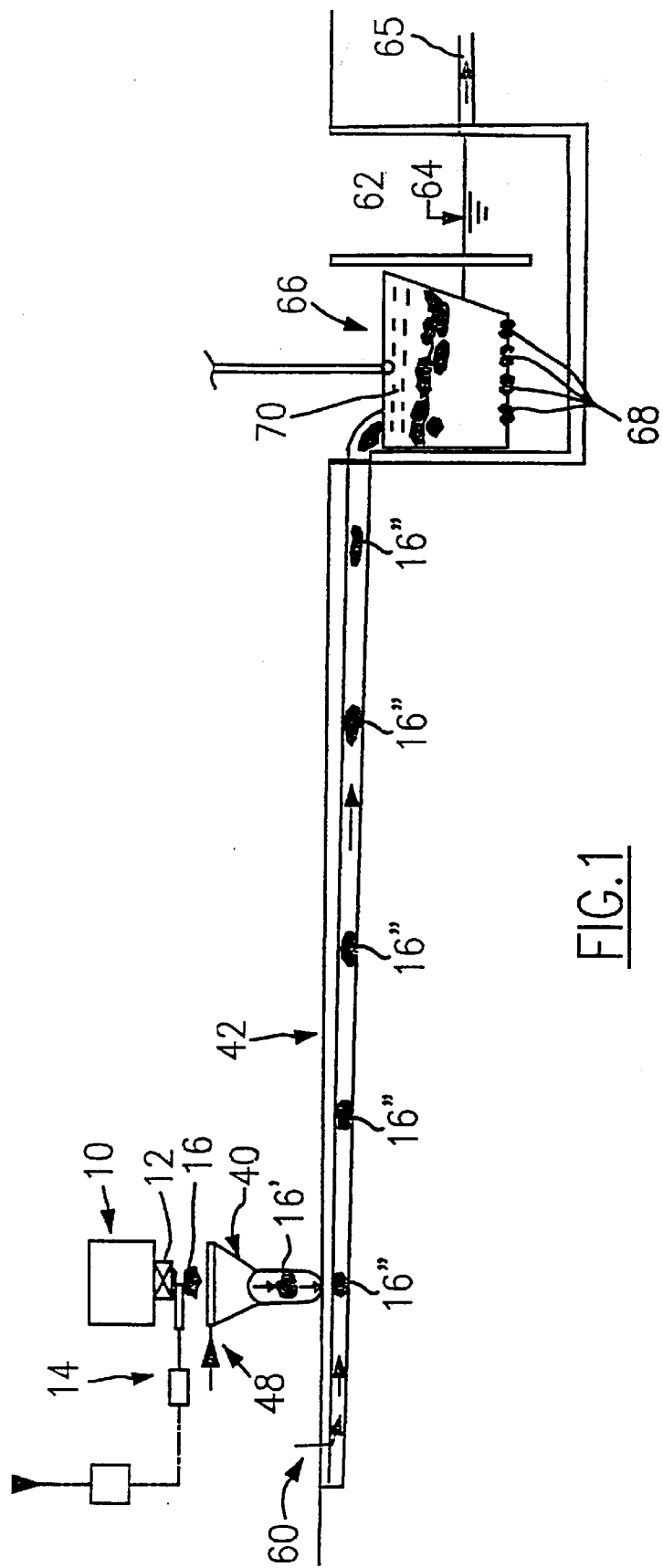
FIG. 1: a diagram of a device for purging a polymer extruder, drawn as a longitudinal section through the device.

In the figures, the same reference numerals denote elements which are identical or similar.

In FIG. 1, the reference numeral 10 identifies a schematic depiction of one component of a high-output extruder as used, for example, for granulating polymers, particularly polyolefins. This component 10 comprises a purge valve 12 which, upon start-up, discharges the molten polymer from the extruder on to the ground without having to pass through the die. The molten polymer leaves the purge valve 12 in the form of a continuous polymer sausage which has the consistency of a sticky paste.

Arranged at the exit of the purge valve is a cutting device 14. This is capable of cutting the continuous stream of polymer at the exit of the purge valve 12 into isolated blocks. The reference numeral 16 identifies such a block at the exit of the cutting device 14.

Figure 2:
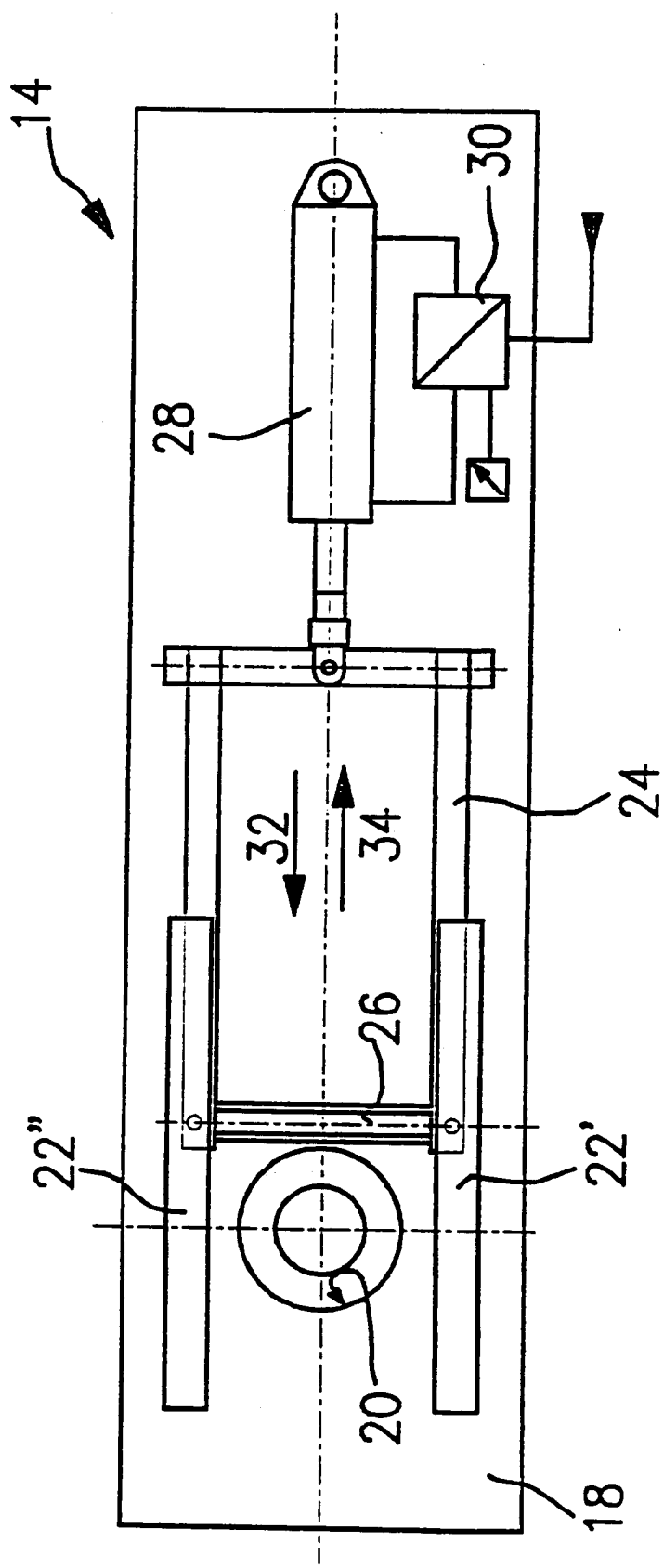
FIG. 2 a plan view of a cutting device with which a device as depicted in FIG. 1 is equipped.

One particularly simple and reliable embodiment of the cutting device 14 will now be described in detail using FIG. 2. A support plate 18, equipped with an opening 20, is fixed on the exit section of the purge valve 12 so that the stream of polymer leaving the purge valve 12 passes through the opening 20. On the opposite side to the purge valve 12, the plate 18 is equipped with two slides 22', 22". A blade holder frame 24 is mounted therein so that it can slide. This frame is equipped with a two-edged blade 26. The blade holder frame 24 is actuated by a double-acting pneumatic cylinder 28. A directional-control valve 30, equipped with a timing relay, allows the cylinder 28 to be supplied so that, first, the blade 26 passes across the opening 20 in the direction of the arrow 32, cutting the polymer sausage a first time at the exit of the opening 20, and then passes back across the opening 20 in the direction of the arrow 34 after a pre-selected space of time DT1, cutting the polymer sausage a second time at the exit of the opening 20. The same cycle is repeated after a space of time DT2. By altering the spaces of time DT1 and DT2 it is naturally possible to alter the weight of the blocks 16. In general, the spaces of time DT1 and DT2 will be chosen to be identical so as to obtain blocks of almost identical weight. It should also be noted that any alteration to the purge rate will obviously entail an adjustment to the spaces of time DT1 and DT2, so as to guarantee that the blocks maintain constant weight.

At the exit of the cutting device 14, the block of polymer 16 which is still rather inconsistent and very sticky, drops into a hydraulic conveying device where it is immediately transported by a flow of liquid, normally a flow of water. This flow of liquid transports the block 16 away from the discharge zone of the purge valve 12, cooling it at the same time.

The hydraulic conveying device shown in FIG. 1 comprises a chute 40 and a discharge channel 42. The chute 40 is arranged immediately beneath the cutting device 14. It receives the block 16 dropping vertically from the cutting device 14 and guides it in a curved path along the channel 42, which is located lower down than the cutting device 14. The reference numeral 16' identifies a block of polymer which is being transported through the chute 40 by a flow of liquid.

A preferred embodiment of the chute 40 will now be described using FIGS. 3 and 4. This chute 40 is made up mainly of a receiving hopper 44 of vertical axis and of a curved discharge duct 46. The receiving hopper 44 is equipped with a liquid-injection device identified overall by the reference number 48. As can best be seen in FIG. 4, the injection device 48 comprises an annular duct which forms the upper edge of the hopper 44. A coupling 50 allows this annular duct to be supplied with a liquid, generally cold water. On its underside, the duct 48 has a slit 52. This slit 52 is orientated in such a way as to inject the liquid into the hopper 44 along the interior walls thereof as if to create a forced flow of liquid towards a mouth 54 into the duct 46. This forced flow of liquid entirely covers the interior walls of the hopper 44 and thus prevents the polymer from sticking to the walls of the chute 40. By causing the lump of polymer to be removed quickly from the hopper 44, the flow also reduces the risk of the lumps of polymer sticking together in the hydraulic conveying device. Finally, the direct contact between the polymer dropping from the cutting device 14 and the forced flow of liquid in the hopper 44 causes almost instant surface solidification of the polymer, which also favours the problem-free removal of the blocks of polymer.

Figure 3:
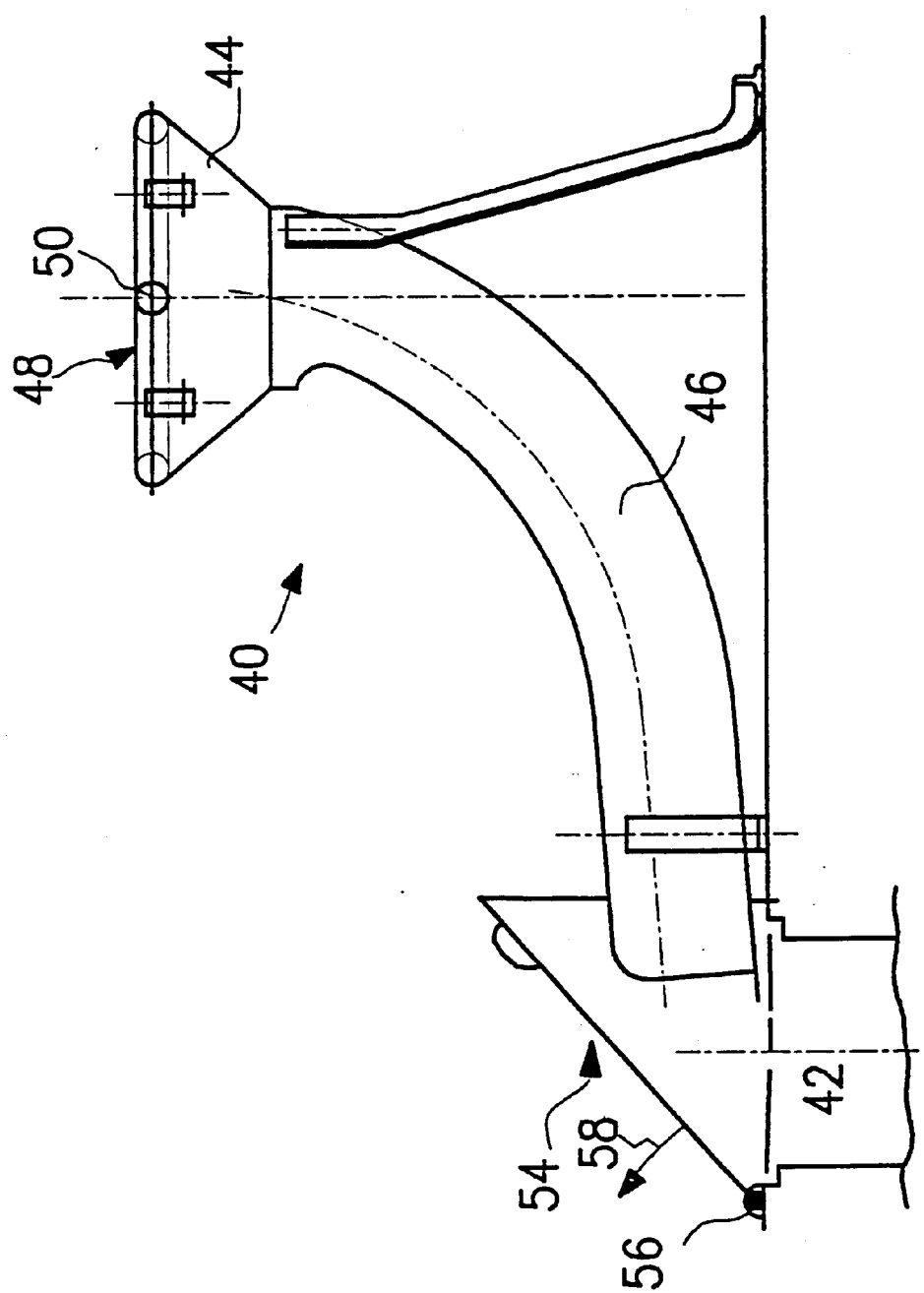
FIG. 3 an elevation of a discharge chute with which a device as depicted in FIG. 1 is equipped.
Figure 4:
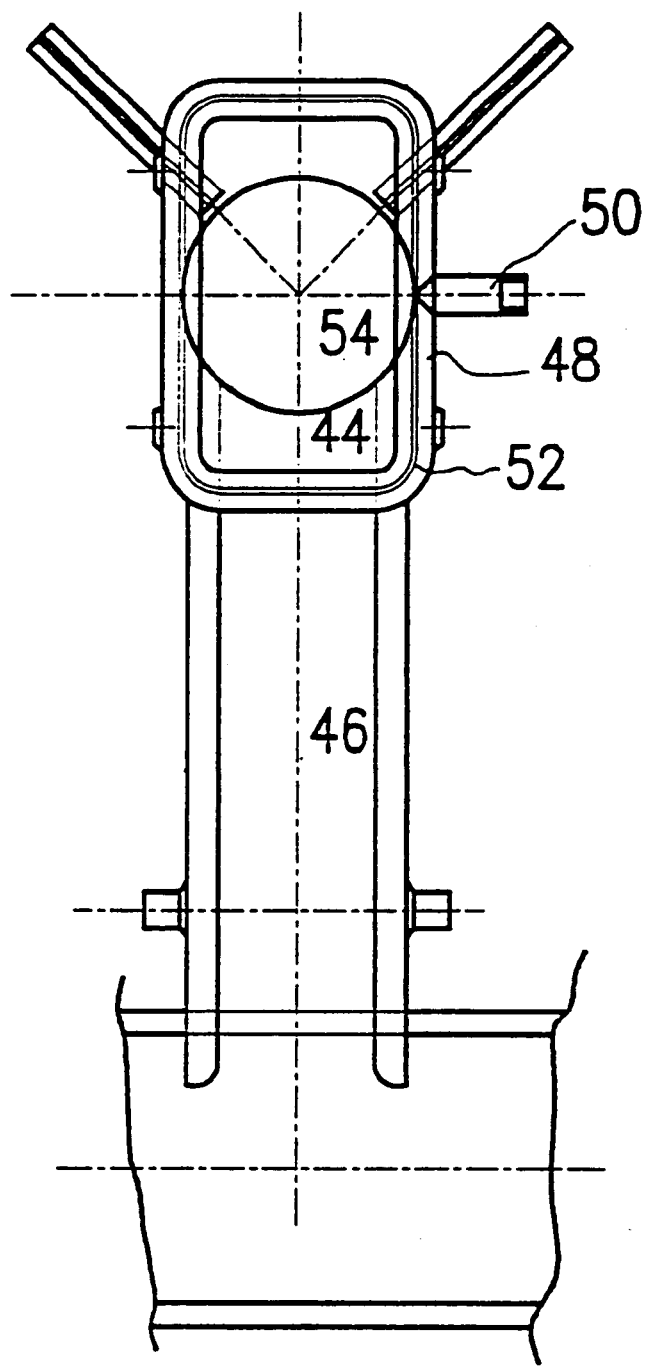
FIG. 4 a plan view of the discharge chute of FIG. 3.

FIG. 3 shows that the discharge duct 46 of the chute 40 opens almost tangentially into the channel 42. The purpose of this is to prevent the blocks of polymer from being slowed down too excessively when these blocks drop from the chute 40 into a forced flow of liquid circulating in the channel 42. It should also be noted that in the embodiment depicted in FIG. 3, the chute is arranged at right angles to the channel 42, and that a screen 54 has been provided along that edge of the channel 42 which faces the exit section of the chute 40. The purpose of this screen is to prevent liquid and/or blocks of polymer from being splashed out of the channel 42. The, screen is also fitted with articulations 56 which are arranged so that the screen can be tilted in the direction of the arrow 58 in order to access the channel 42 at this point.

This screen can also be used to close off the opening of the channel once the extruder is in steady state operation, so as to afford greater safety.

FIG. 1 shows a longitudinal section through the channel 42. In this instance it is a buried channel, but obviously it would also be possible to envisage a suspended duct or one supported above the ground. Upstream of the point at which the chute 40 discharges the blocks 16' into the channel 42, the latter has its own liquid supply 60. The flow rate and pressure of this liquid supply 60 are adjusted so as to create a forced flow of liquid in the channel 42 vigorously transporting the blocks of polymer as soon as they drop into the channel 42. This prevents the successively cut blocks of polymer from being able to join up, come together and possibly block the channel 42. The reference numerals 16" indicate blocks of polymer on their journey along the channel 42.

FIG. 1 shows that the channel 42 opens into a pit 62. This pit 62 is generally located a certain distance away from the actual extrusion space proper. It may even be located outside the extrusion building. An outflow pipe 65 opens into the pit 62 at a certain height off the bottom. It ensures that a roughly constant level of liquid 64 is maintained in the pit 62.

A skip 66 is arranged in the pit 62 under the mouth of the channel 42, so that the blocks 16" are transported with the flow of liquid leaving the channel 42 into the skip 66. The latter is equipped with liquid discharge openings 68 in its bottom, so that the liquid can flow out into the pit 62, while the blocks of polymer are held in the skip 66. It will be noted that the skip 66 is partially immersed in the liquid which settles in the pit. This ensures that the blocks received in the skip are always immersed in the cooling liquid, even when the channel 42 is not delivering. Openings 70 in the upper part of the skip 66, by contrast, prevent the liquid level from rising too high in the skip 66 when the channel 42 is delivering because overfill from the skip could actually carry polymer blocks with it into the pit 62. To empty the skip 66, the latter is simply raised using an appropriate handling device. The liquid flows out through the openings 68 in the bottom of the skip 66. When the liquid has been completely removed, the blocks collected in the skip 66 can be tipped out into a container simply by tilting the skip 66 or alternatively by opening its bottom.

It should also be noted that several channels 42 may open into the one same pit 62 and that one channel 42 may of course serve several extruders.

What is claimed is:

1. Device for purging a polymer extruder, comprising a purge valve located upstream of the die for discharging a molten polymer from the extruder in the form of a continuous stream; comprising:

a cutting device arranged at the exit of the purge valve, the cutting device being capable of cutting the continuous stream of polymer leaving the purge valve into blocks, wherein the cutting device is a knife; and a conveying device arranged at the exit of the cutting device, so as to transport the blocks immediately a certain distance away from the extruder.

2. Device according to claim 1, wherein the conveying device is a hydraulic device which transports the blocks in a flow of liquid.

3. Device according to claim 2, wherein the hydraulic conveying device comprises a block-discharge chute located beneath the cutting device; the chute being equipped with a liquid-injection device so as to create in the chute a flow of liquid for transporting the blocks.

4. Device according to claim 2, wherein the hydraulic conveying device comprises a channel for receiving the blocks cut by the cutting device; the channel being equipped with a device for circulating a liquid so that the blocks are transported in the channel by a strong flow of liquid.

5. Device according to claim 4, comprising a block-discharge chute located beneath the cutting device so that the blocks drop from the chute into the channel and are successively carried away by the flow of liquid in the channel.

6. Device according to claim 2, wherein the hydraulic conveying device opens into a device for collecting the blocks, this device being equipped in such a way as to hold the blocks while at the same time allowing the liquid which conveyed the blocks to pass through.

7. Device according to claim 6, wherein the device for collecting the blocks comprises a collecting skip arranged in a pit so that the blocks transported by the flow of liquid drop into the skip.

8. Device according to claim 7, wherein the bottom of the skip comprises openings for discharging the liquid, through which openings the liquid can flow when the skip is raised.

9. Device according to claim 1, wherein the cutting device comprises the knife guided in a support structure fixed on the exit section of the purge valve.

10. Device according to claim 9, wherein the knife is actuated by a pneumatic cylinder controlled by a timing relay.

11. Device according to claim 9, wherein the sliding knife has a two-edged blade.

* * * * *